J. T. BONNELL.
Ore Stamp.
No. 55,995.
Patented July 3, 1866.
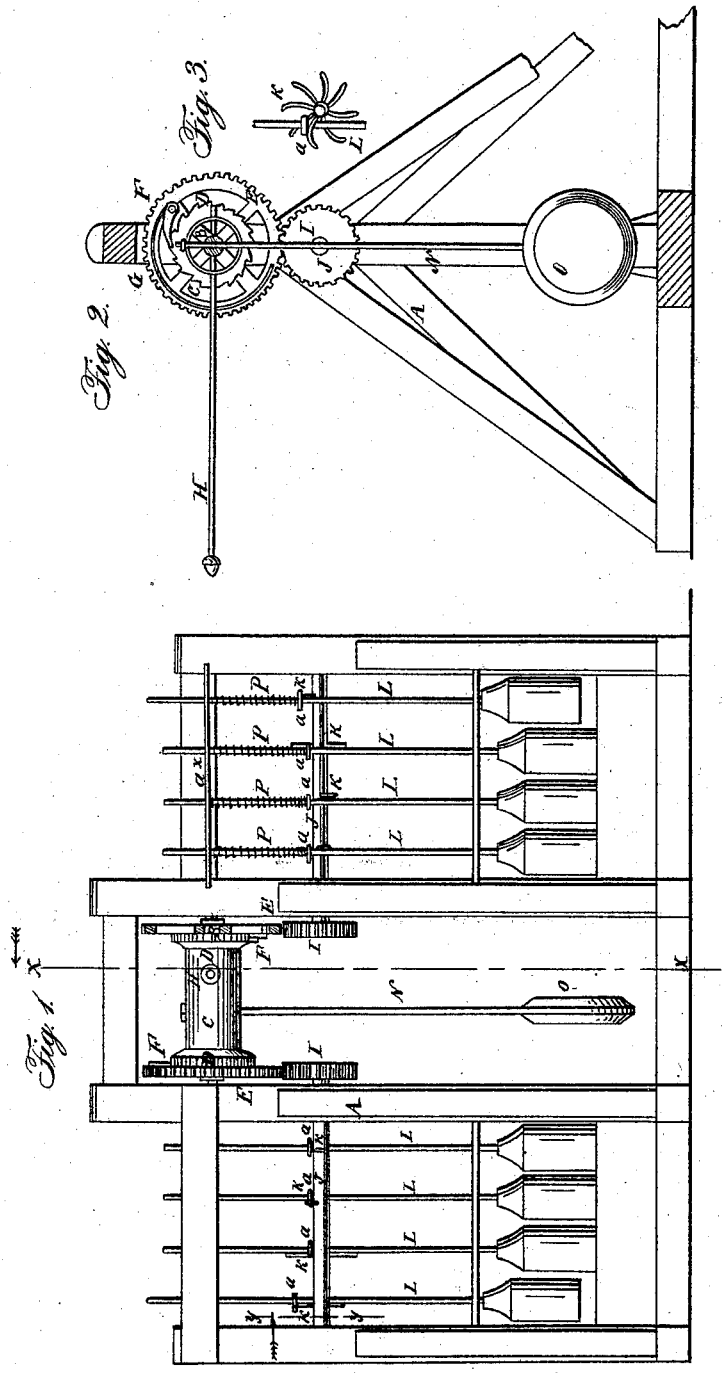
Witnesses:
Inventor:

UNITED STATES PATENT OFFICE.

JOHN T. BONNELL, OF COLUMBIA, CALIFORNIA.

IMPROVEMENT IN QUARTZ-MILLS.

Specification forming part of Letters Patent No. 55,995, dated July 3, 1866.

*To all whom it may concern:*

Be it known that I, JOHN T. BONNELL, of Columbia, in the county of Tuolumne and State of California, have invented a new and useful Improvement in Quartz-Crushers; and I do hereby declare that the following is a full, clear, and exact description thereof, which will enable others skilled in the art to make and use the same, reference being had to the accompanying drawings, forming part of this specification, in which—

Figure 1 is a front elevation of my invention; Fig. 2, a transverse vertical section of the same, taken in the line $x\ x$, Fig. 1; Fig. 3, a vertical section of a portion of the same, taken in the line $y\ y$, Fig. 1.

Similar letters of reference indicate like parts.

This invention relates to a new and useful improvement in that class of quartz-crushers which are provided with rising and falling weights, pounders, or stamps; and it consists in a novel and improved means for operating said weights, pounders, or stamps, whereby the machine may be worked by hand with a very moderate expenditure of power.

A represents a framing, which may be constructed in any proper manner to support the working parts; and B is a horizontal shaft, placed in the upper part of the framing, about at its center, and having a drum, C, keyed firmly upon it, with a ratchet, D, at each end, one ratchet having its teeth in a reverse to those of the other. On this shaft B there are placed loosely two spur-wheels, E E, at each end of the drum C, and these wheels have each a pawl, F, attached, with spring G bearing upon them to keep them in contact with ratchets. (See Fig. 2.)

The drum C has a lever, H, attached to it, and the wheels E E gear into pinions I I on the inner ends of shafts J J, placed horizontally in the framing A, and having arms or wipers K attached, which act upon or against buttons $a$ on vertical rods L, having weights or pounders M at their lower ends.

The rods L work in suitable guides in the framing A, and they may be arranged in the usual way.

The drum C has a pendent rod, N, attached to it, said rod having a weight or bob, O, at its lower end.

The drum C is turned first in one direction and then in the other through the medium of the lever H, the rod N and weight O acting like a pendulum and greatly facilitating the work, the shafts J J being turned alternately so as to raise the rods L, each shaft, in the present instance, having four rods, L, applied to it. These shafts, it will be seen, are rotated in opposite directions. one wheel E being turned with the drum when the latter is turned in one direction and the other remaining stationary. As the motion of the drum changes the wheel E, which was stationary at the former movement, is turned and the other remains stationary, the pawls F and ratchets D effecting this result.

I have spiral springs P placed on the rods L, in order to assist the weights or pounders M in falling, and to aid their efficiency, the upper ends of said springs bearing against a guide-bar, $a^*$, in the framing and the lower ends against the buttons $a$.

By this simple arrangement the device may be operated by hand with the greatest facility and with but little labor.

Having thus described my invention, I claim as new and desire to secure by Letters Patent—

The drum C, provided with ratchets D D and a pendent rod, N, with a weight or bob, O, attached, in combination with the spur-wheels E E, placed loosely on the shaft of drum C, and provided with pawls F, to engage with the ratchets D, the above parts being used in connection with the pinions I I on the shafts J J, which actuate the weight or pounder rods L, substantially as and for the purpose specified.

The above specification of my invention signed by me this 9th day of October, 1865.

JOHN T. BONNELL.

Witnesses:
 ALEX. M. DOBBIE,
 EDWIN E. WHITE.